United States Patent
Martini et al.

(10) Patent No.: US 10,063,162 B2
(45) Date of Patent: Aug. 28, 2018

(54) MULTI LEVEL INVERTER

(71) Applicant: ABB Schweiz AG, Baden (CH)

(72) Inventors: David Martini, San Giovanni Valdarno (IT); Fabio Tombelli, Montelupo Florentino (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/311,815

(22) PCT Filed: May 16, 2014

(86) PCT No.: PCT/EP2014/060152
§ 371 (c)(1),
(2) Date: Nov. 16, 2016

(87) PCT Pub. No.: WO2015/172851
PCT Pub. Date: Nov. 19, 2015

(65) Prior Publication Data
US 2017/0099013 A1    Apr. 6, 2017

(51) Int. Cl.
*H02M 7/487* (2007.01)
*H02M 1/08* (2006.01)
*H02M 1/12* (2006.01)
*H02M 1/00* (2006.01)

(52) U.S. Cl.
CPC ............ *H02M 7/487* (2013.01); *H02M 1/08* (2013.01); *H02M 1/12* (2013.01); *H02M 2001/007* (2013.01); *H02M 2001/0048* (2013.01)

(58) Field of Classification Search
CPC .......... H02M 1/08; H02M 1/12; H02M 7/483; H02M 7/487; H02M 2001/007; H02M 2001/0048
See application file for complete search history.

(56) References Cited

U.S. PATENT DOCUMENTS

| | | | | |
|---|---|---|---|---|
| 6,005,787 A | * | 12/1999 | Mizukoshi | H02M 7/483 307/44 |
| 7,102,321 B2 | * | 9/2006 | Edwards | H02M 7/487 318/400.26 |
| 7,219,673 B2 | * | 5/2007 | Lemak | H02M 5/458 363/132 |
| 2013/0015821 A1 | * | 1/2013 | Kim | H02J 7/0019 320/128 |

(Continued)

FOREIGN PATENT DOCUMENTS

| | | |
|---|---|---|
| EP | 2568591 A1 | 3/2013 |
| JP | 2007028860 A | 2/2007 |
| JP | 2011142783 A | 7/2011 |

OTHER PUBLICATIONS

International Search Report and Written Opinion, PCT/EP2014/060152, ABB Technology AG, dated Jan. 23, 2015, 8 pages.

*Primary Examiner* — Matthew Nguyen
(74) *Attorney, Agent, or Firm* — J. Bruce Schelkopf; Taft Stettinius & Hollister LLP

(57) ABSTRACT

Multi-level inverter introducing a new topology wherein standard IGBTs can be employed in place of common emitter IGBTs, wherein switching and conduction losses are minimized and wherein the number of implemented levels can be easily increased with the addition of a minimum number of components.

20 Claims, 14 Drawing Sheets

(56) References Cited

U.S. PATENT DOCUMENTS

2013/0094260 A1* 4/2013 Martini .............. H02M 7/483
363/97
2014/0198547 A1* 7/2014 Heo .................. H02M 7/44
363/95

* cited by examiner

MULTI LEVEL INVERTER

TECHNICAL FIELD OF THE INVENTION

The present invention relates to the general technical field of power inverters and in particular to the technical field of multi-level inverters comprising three or more voltage levels.

STATE OF THE ART

Multilevel inverter technology has emerged as a very important alternative in the area of high-power medium-voltage energy control.

Voltage source multi-level inverters (comprising three or more voltage levels) are generally used to get a better approximation of the voltage waveform on the AC side of the inverter. As an important side benefit, they provide important improvements in terms of reducing the switches power losses and reducing the THD (Total Harmonic Distortion) of the output current and output voltage.

Multilevel inverters, in general, are adapted to provide an output waveform that exhibits multiple steps at several voltage levels. Therefore, multilevel inverters can be adapted to produce a quasi-sinusoidal wave by having split-rail direct current inputs at two voltages, or positive and negative inputs with a central ground. As an example, a three level inverter, with two DC input voltages and a ground reference point, generally operates in a way to connect the inverter output terminals in sequence between the positive rail and ground, the positive rail and the negative rail, the ground rail and the negative rail and then both to the ground rail, so that a stepped waveform is generated at the inverter output.

Multilevel inverters thus operate in a way to vary gradually three or more voltage levels in order to approximate stepped forms which are controlled to implement a sort of Pulse Amplitude Modulation. In addition, Pulse Width Modulation is implemented to control the transition between two voltage levels in the vicinity of the level changes. Thus, the multi-level inverter can decrease the number of commutations and therefore decrease harmonic frequency components, reducing switching losses. The resulting low harmonic frequency components in the current output from the multi-level inverter is advantageous in that, for grid-tied inverters supplied by photovoltaic panels, it allows to meet the stringent constraints on the THD of the AC current delivered to the AC grid.

The main topologies of state-of-the-art multi-level voltage-source inverters are generally known as Neutral Point Clamped (NPC), Cascaded H-Bridge (CHB), Flying Capacitors (FCs) and Multi Point Clamped (MPC).

The Multi Point Topology is a clamped topology wherein diodes or other electronic switching devices are used to clamp the dc bus voltages so as to achieve steps in the output voltage.

In general, for a N level clamped inverter, when N is sufficiently high, the number of clamping devices and the number of switching devices will increase and make the system impracticable to implement. If the inverter runs under pulse width modulation (PWM) and diodes are used as clamping devices, the diode reverse recovery of these clamping diodes may become a major design challenge.

An overview about state-of-the-art multi-level voltage inverters is provided in U.S. Pat. No. 4,467,407 wherein several multi-level topologies are described and commented.

An example of Multi Point Clamped inverter of the prior art is depicted in FIG. 1 illustrating a four-level DC-AC converter with an LC output inverter wherein the switching devices are made with IGBTs provided with antiparallel diodes in order to have all the inverter branches allowing bidirectional current.

The ON/OFF state of the IGBTs of the circuit defines the voltage level on the AC side in that the switching devices Q1 and Q2 (associated to driving signals C and An respectively) and the switching devices Q3 and Q4 (associated to driving signals Bn and D respectively) are adapted to connect the negative terminal of DC voltage V− and the positive terminal of DC voltage source V+ with the load on AC side, the switching device Q5 (associated to driving signal A) is adapted to connect the positive terminal of the voltage source V4+ to the load and the switching device Q6 (associated to driving signal B) is adapted to connect the negative terminal of the voltage source V4− to the load.

The state of IGBTs is chosen as a function of AC output voltage. Three operative conditions occur depending on the level of output AC voltage Vout:

1) V−<Vout<V+; 2) Vout>V+ and 3) Vout<V−.

Accordingly, the inverter modulation algorithm requires only three independent driving PWM signal, A, B and D. FIG. 2 illustrates said driving PWM signal referenced to the voltage of the input voltage mid-point M. Driving signal C (complementary of driving signal D) is applied to the gate of the switch Q1, driving signal An (complementary of driving signal A) is applied to the gate of the switch Q2, driving signal Bn (complementary of driving signal B) is applied to the gate of the switch Q3, driving signal D is applied to the gate of the switch Q4, driving signal A is applied to the gate of the switch Q5 and driving signal B is applied to the gate of the switch Q6.

During the time interval wherein V−<Vout<V+, driving signals A and B are constantly OFF and therefore driving signals An and Bn are constantly ON. Driving signals C and D oscillates between ON and OFF levels and provide, on the AC side, a voltage waveform oscillating between the voltage values V− and V+. The DC-AC converter works like a standard two level inverter. FIG. 3 illustrates the current paths of the inverter circuit when driving signal C is ON and driving signal D is OFF (and vice versa) and cos φ equals 1 or 0, wherein φ is the phase shift between voltage and current waveforms.

When the output voltage Vout is higher than V+, driving signals C and Bn are constantly ON and therefore driving signals D and B are constantly OFF. Driving signals A and An oscillates between ON and OFF levels and provide, on the AC side, a voltage waveform oscillating between the voltage values V+ and V4+. FIG. 4 illustrates the current paths of the inverter circuit when driving signal A is ON and driving signal An is OFF (and vice versa) and cos φ equals 1 or 0, wherein φ is the phase shift between voltage and current waveforms.

When the output voltage Vout is lower than V−, driving signals C and A are constantly OFF and therefore driving signals D and An are constantly ON. Driving signals B and Bn oscillates between ON and OFF levels and provide, on the AC side, a voltage waveform oscillating between the voltage values V− and V4−. FIG. 5 illustrates the current paths of the inverter circuit when driving signal B is ON and driving signal Bn is OFF (and vice versa) and cos φ equals 1 or 0, wherein φ is the phase shift between voltage and current waveforms.

The multi-level inverters of the kind described above normally employ IGBTs as power switches due to their feature of combining the simple gate-drive characteristics of the MOSFETs with the high-current and low-saturation-voltage capability of bipolar transistors that allows these devices to achieve a maximum switching frequency well greater than 100 kHz with unmatched reliability and ruggedness.

The main drawback of the multi-level inverter topology described above is the need of common emitter IGBTs which, at present, are not common among the main power semiconductor suppliers. A second important drawback of the multi-level inverter topology described above is the need of IGBTs with a voltage rating higher than the working DC bulk voltage. The higher the voltage rating the lower the overall efficiency due to the fact that, in general, both switching and conduction losses increase. Higher voltage rating IGBTs have higher VCEsat (and therefore higher conduction losses) and higher turn off and turn on times (and therefore higher switching losses).

The multi-level inverter according to the present invention aims at solving the above problems of the state of the art introducing a new topology wherein standard IGBTs can be employed in place of common emitter IGBTs, wherein switching and conduction losses are minimized and wherein the number of implemented levels can be easily increased with the addition of a minimum number of components.

Further objects and features of the present invention will be understood from the following detailed description of preferred, but non-exclusive, embodiments of the multi-level inverter according to the invention, when taken in conjunction with the accompanying drawings in which like reference numerals designate like parts and wherein.

DETAILED DESCRIPTION OF THE INVENTION

The multi-level inverter according to the present invention comprises: an input power source including a plurality of DC power supplies connected in series with same polarities; a plurality of terminals for taking desired DC voltage levels from said input power source, said terminals being electrically connected to each end of said DC power supplies and comprising a voltage reference, or ground, terminal; a plurality of switch blocks each comprising at least one input terminal and at least one output terminal, each switch block including, in turn, a plurality of on/off switches having open modes and short-circuit modes and input terminals and output terminals; a load having load terminals to be connected to the output terminals of said switch blocks.

Figure 1:
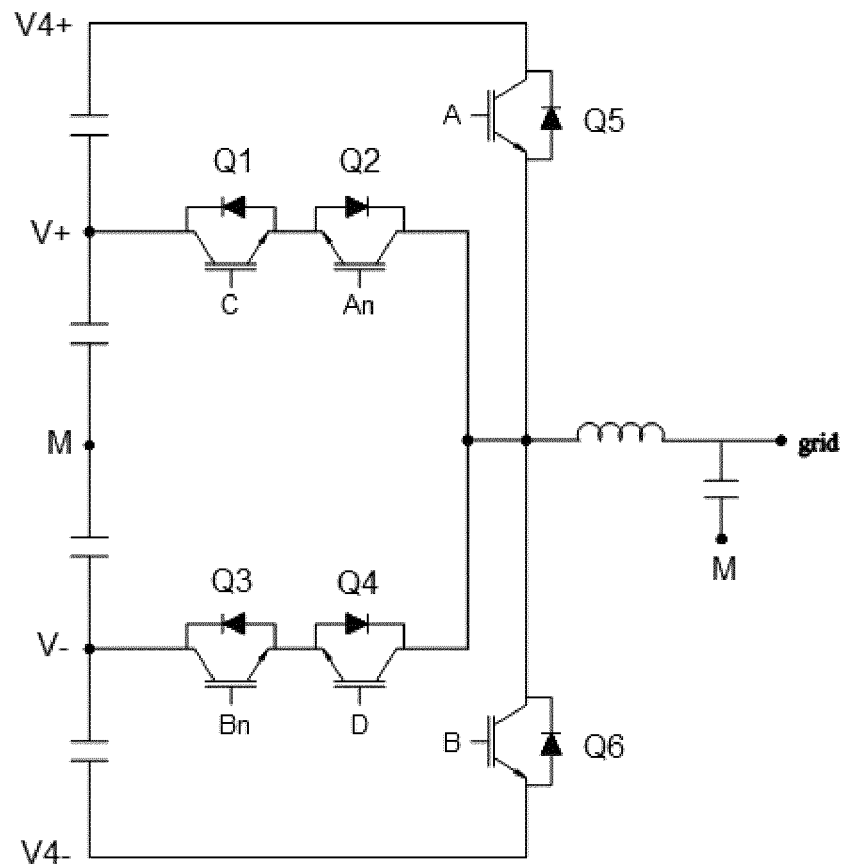
FIG. 1 shows a four-level Multi Point Clamped inverter of the state of the art with an LC output.
Figure 2:
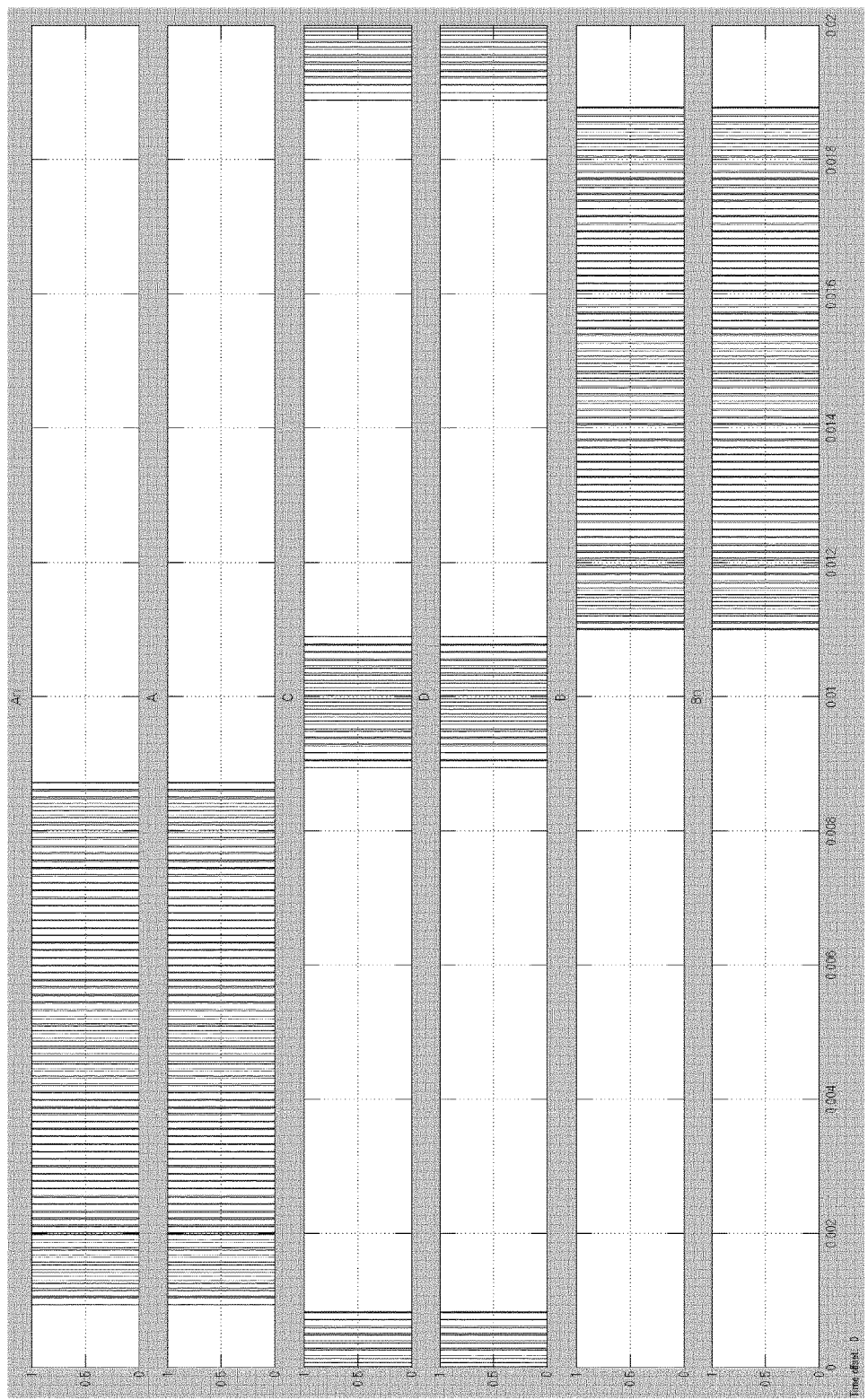
FIG. 2 shows the driving PWM signal for the switches of the four-level Multi Point Clamped inverter circuit of FIG. 1.
Figure 3:
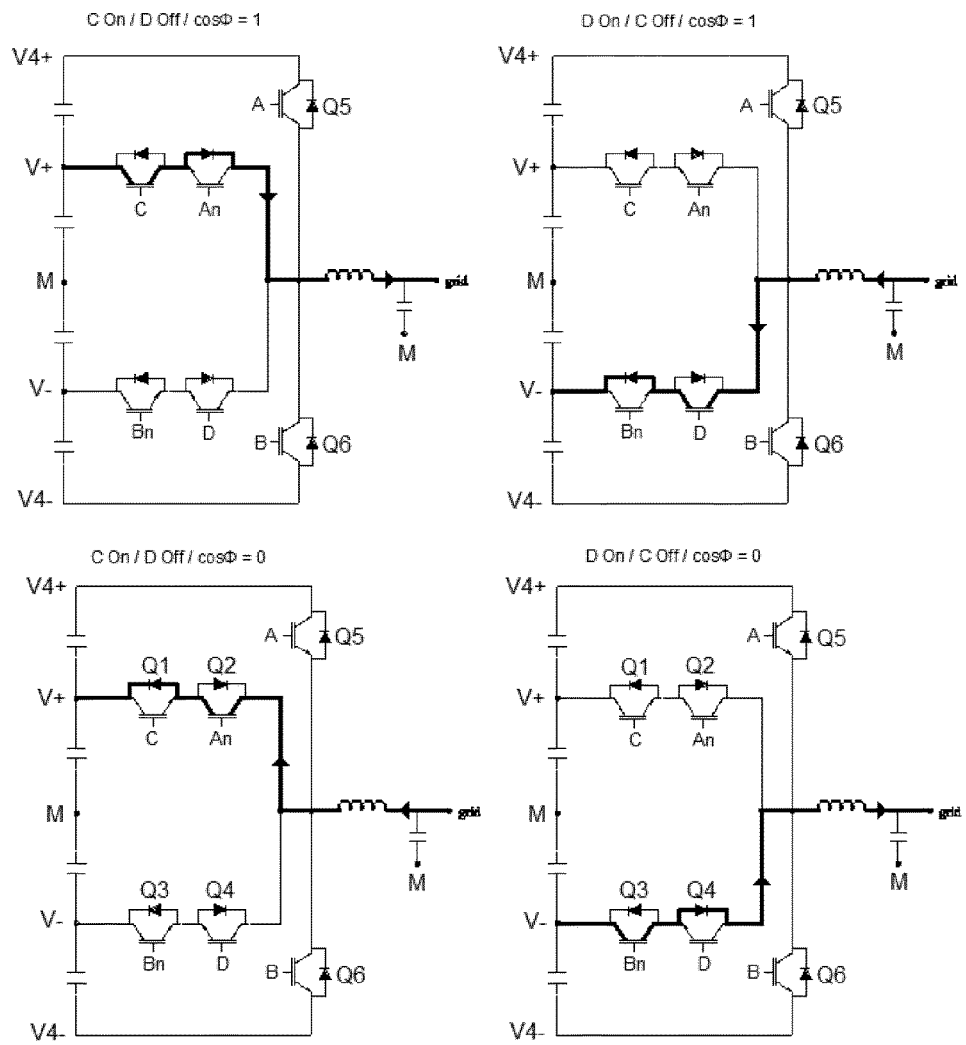
FIG. 3 shows the current paths of the Multi Point Clamped inverter circuit of FIG. 1 in a first operating condition.
Figure 4:
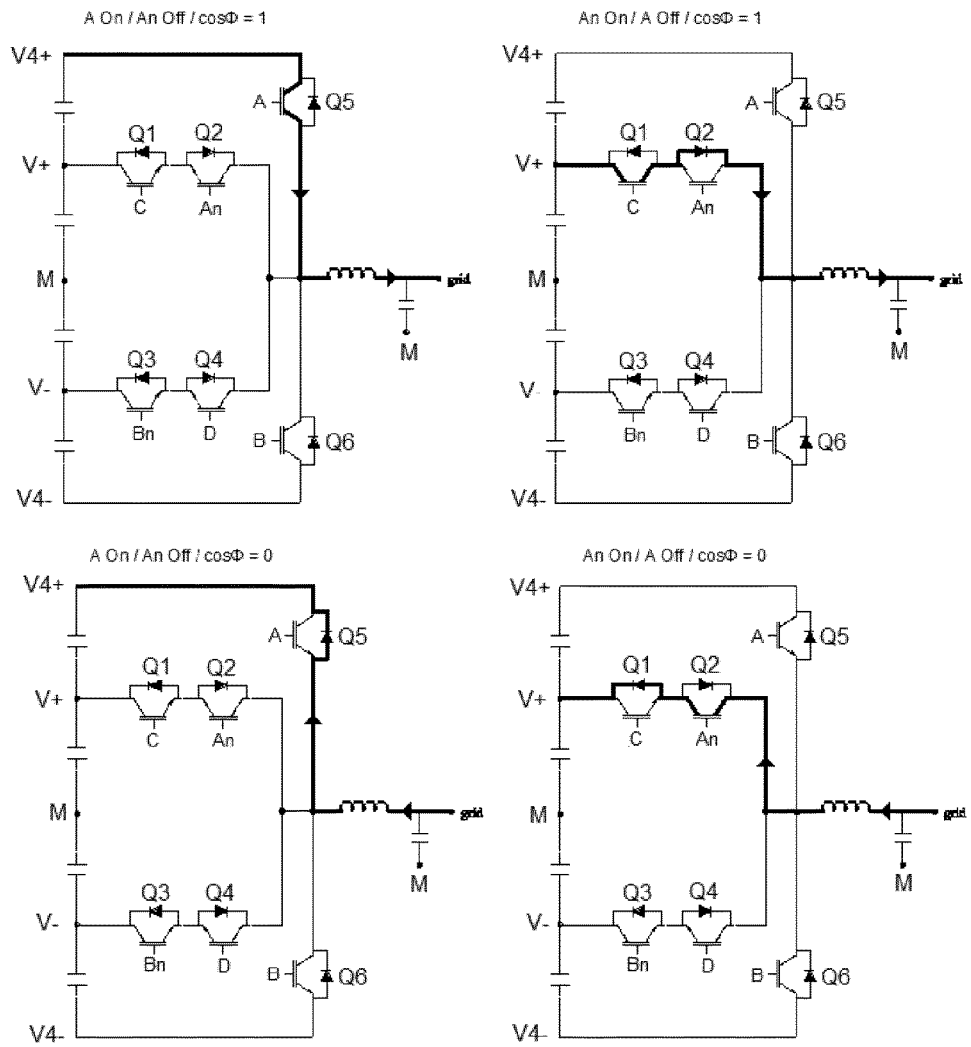
FIG. 4 shows the current paths of the Multi Point Clamped inverter circuit of FIG. 1 in a second operating condition.
Figure 5:
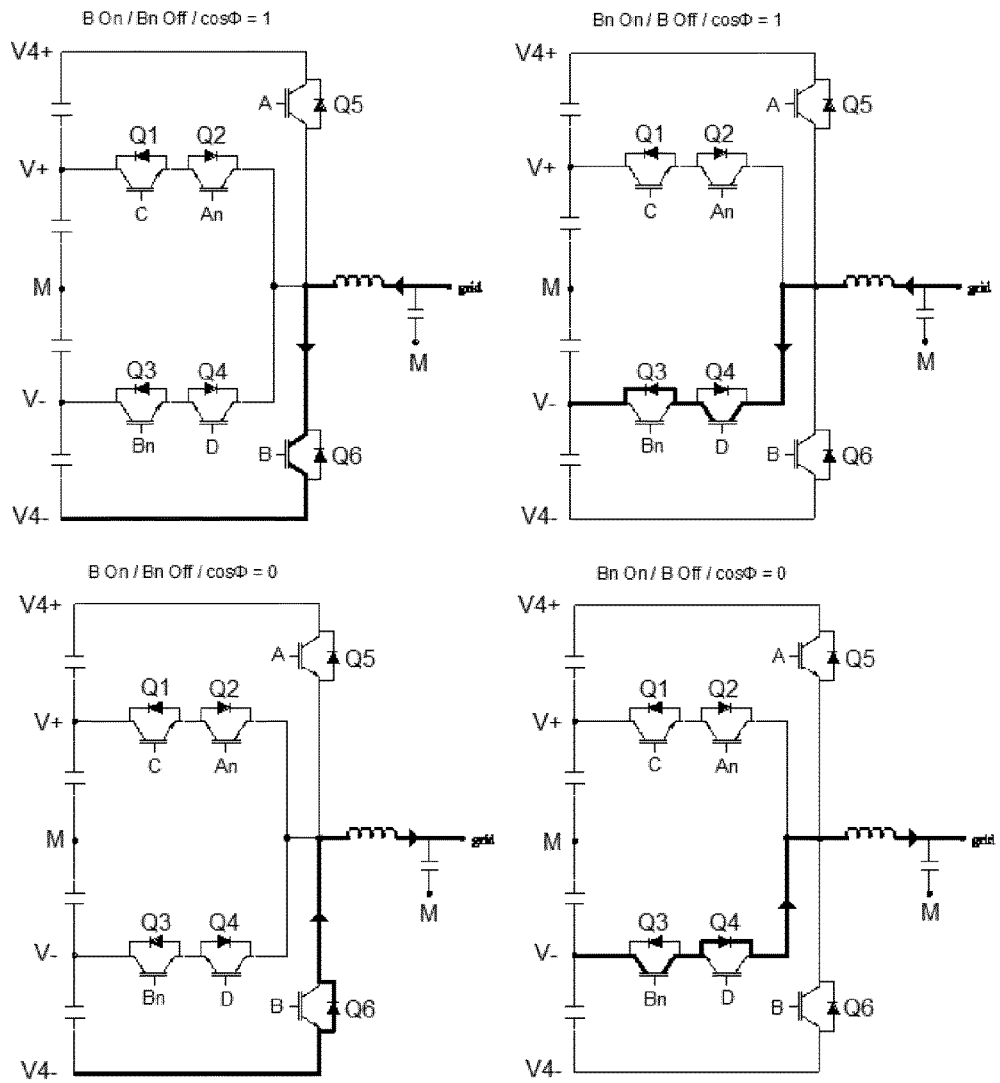
FIG. 5 shows the current paths of the Multi Point Clamped inverter circuit of FIG. 1 in a third operating condition.
Figure 6:
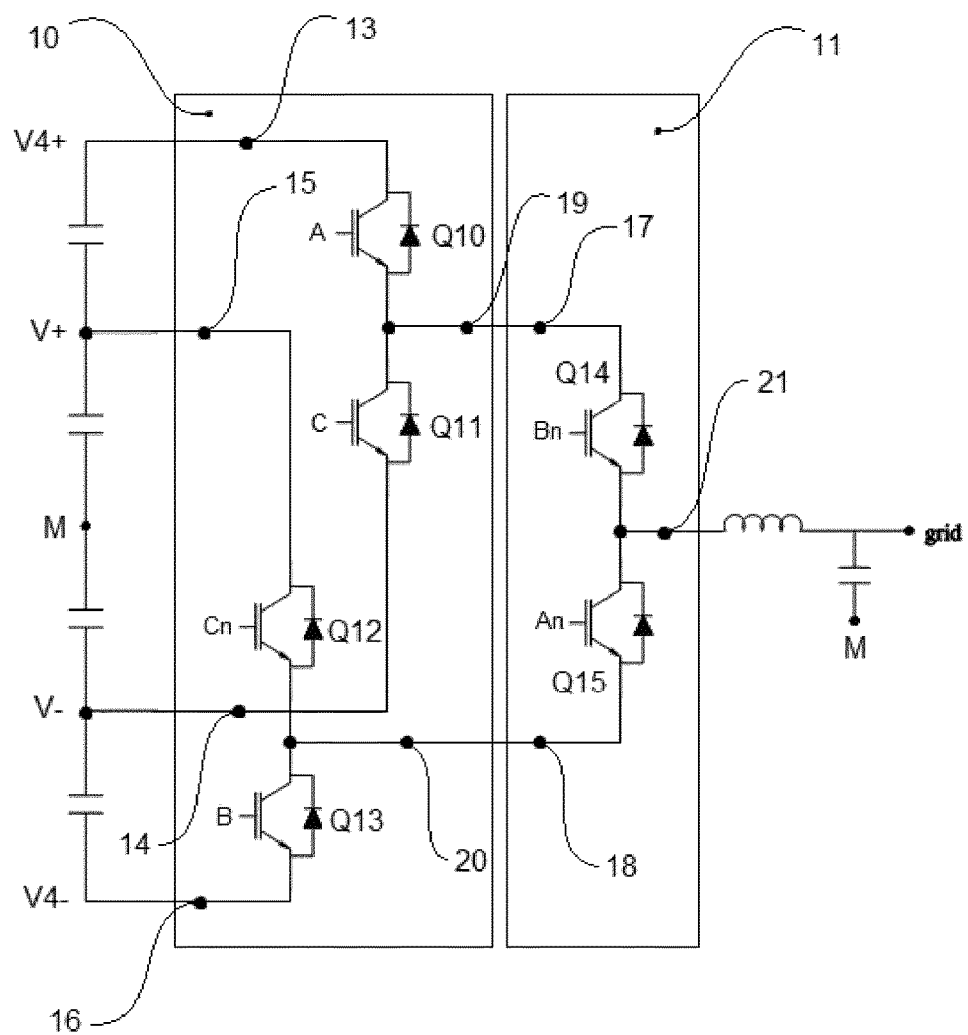
FIG. 6 shows the four-level Multi Point Clamped inverter according to the present invention with an LC output.

With reference to enclosed FIG. 6, a first preferred embodiment of the multi-level inverter according to the present invention is illustrated, comprising a four-level Multi Point Clamped single phase inverter, associated to an input power source including a plurality of DC power supplies serially interconnected with same polarities. Said input power source may comprise an input capacitor bank comprising a plurality of capacitors connected in series between the terminals of a single DC input bulk voltage, in order to split said DC input bulk voltage in a plurality of DC voltage levels referred to the voltage of the mid-point M which is taken as reference voltage or zero voltage. Alternatively, said input power source may comprise a plurality of batteries connected in series and adapted to provide a plurality of DC voltage levels referred to the voltage of said mid-point M.

In the example illustrate in FIG. 6, the DC voltage levels of said input power source comprise: a higher positive voltage V4+, a lower positive voltage V+, a lower negative voltage V− and a higher negative voltage V4−.

The four-level Multi Point Clamped inverter according to the first preferred embodiment of the present invention comprises a plurality of switch blocks including: input switch blocks 10 having first input terminals 13, 14, 15, 16, each coupled to a different one of said voltage level terminals, and first output terminals 19, 20; and output switch blocks 11 having second input terminals 17, 18, each one coupled to a different one of said first output terminals 19, 20 of said input switch blocks 10, and second output terminals 21, each one coupled to a different one of said load terminals.

Each one of said switch blocks preferably comprises a couple of switches, an upper switch and a lower switch, arranged as half-bridges with the emitter of the upper switch electrically connected to the collector of the lower switch at a center point, said center point being the output terminal of each one of said switch blocks, the collector of the upper switch and the emitter of the lower switch being the input terminals of each one of said switch blocks. Other arrangements may be chosen for said switch blocks like, for instance, full bridge topology, wherein said switch blocks include four switches each. Said switches may advantageously and preferably comprise semiconductor switches.

In greater detail and with reference to FIG. 6, said input switch blocks 10 may include a first and a second switch block. Said first and second switch blocks may include two switches connected as a half-bridges.

Thus, said first switch block may comprise the switches Q10 and Q11 arranged as a half bridge with the emitter of Q10 electrically connected to the collector of Q11 at the center point of said half-bridge, said center point being connected to the output terminal of said first switch block.

Said second switch block may comprise the switches Q12 and Q13 arranged as a half bridge with the emitter of Q12 electrically connected to the collector of Q13 at the center point of said half-bridge, said center point being connected to the output terminal of said second switch block.

Said output switch blocks 11 may include a third switch block. Said third switch block may include the switches Q14 and Q15 arranged as a half bridge, with the emitter of Q14 electrically connected to the collector of Q15 at the center point of said half-bridge, said center point being connected to the output terminal of said third switch block.

The collector of the upper switch Q10 of said first switch block is connected to the higher positive voltage V4+ terminal, the emitter of the lower switch Q11 of said first switch block is connected to the lower negative voltage V− voltage terminal; the collector of the upper switch Q12 of said second switch block is connected to the lower positive voltage V+ terminal, the emitter of the lower switch Q13 of said second switch block is connected to the higher negative voltage V4− terminal; the collector of the upper switch Q14 of said third switch block is connected to the center point of said first switch block, the emitter of said third switch block is connected to the center point of said second switch block. The center point of said third switch block is connected to the load terminal and provides said load with an AC voltage referred to the voltage of the mid-point M. The load can be an AC single-phase distribution network or any load requiring single-phase AC supply.

Preferably, an LC filter is connected between the center point of said third switch block and the load in order to provide suppression of unwanted EMI noise generated by the inverter.

The topology described above and illustrated in FIG. 6 can be easily multiplied by three to be implemented as four-level Multi Point Clamped three-phase inverter, wherein said input switch blocks 10 and said output switch blocks 11 are in number of three and the output terminals of said output switch blocks 11 are each coupled to a different one of the three phase grid terminals and said mid-point M is coupled to the neutral terminal. Same considerations apply to multi-phase systems in general.

As in the multi-level inverter circuits of the state of the art, the ON/OFF state of the switches of the multi-level inverter circuit according to the present invention defines the voltage level on the AC output side.

The state of switches is chosen as a function of AC output voltage. Three operative conditions occur depending on the level of output AC voltage Vout:

1) V−<Vout<V+; 2) Vout>V+ and 3) Vout<V−.

Figure 8:
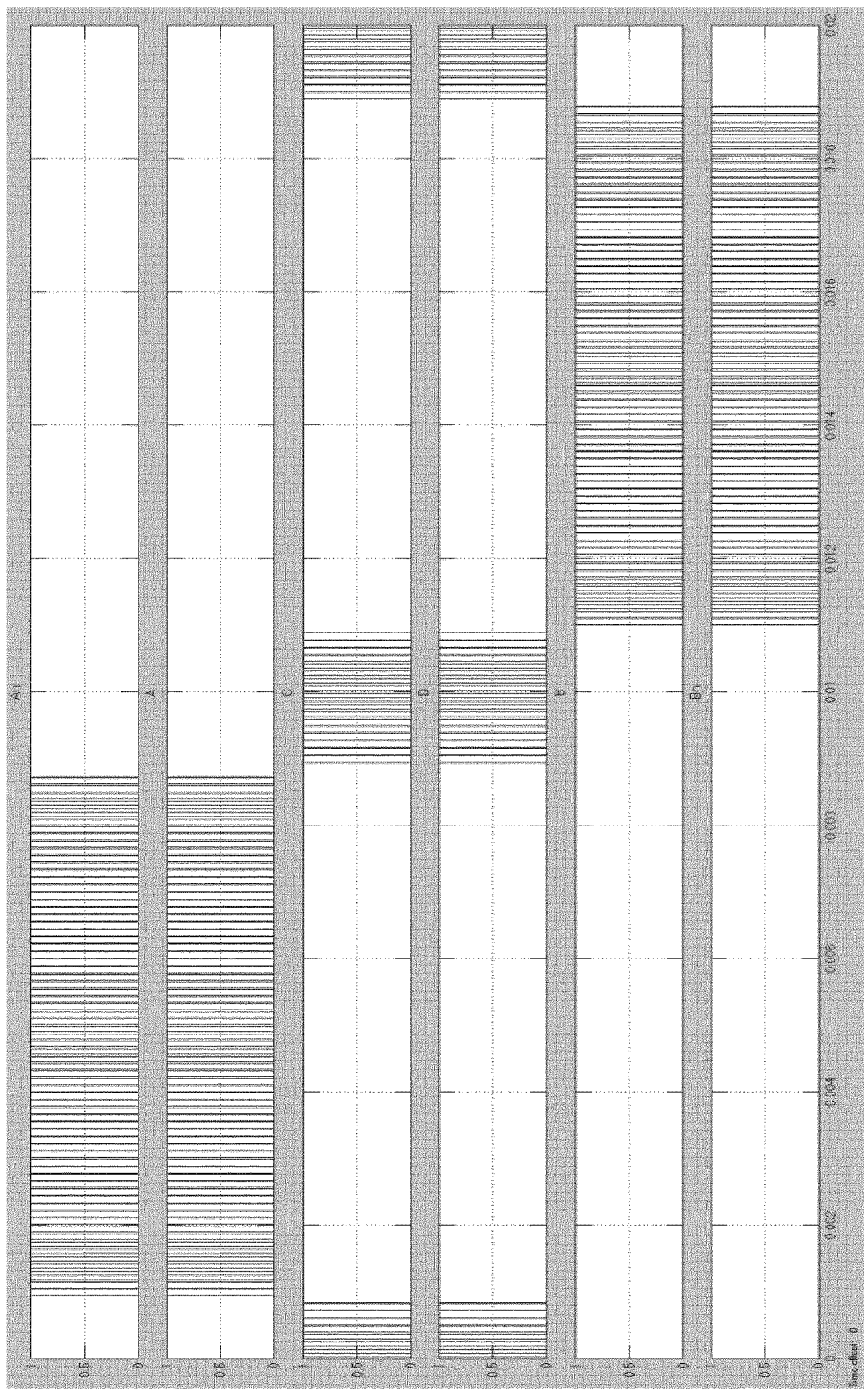
FIG. 8 shows the driving PWM signal for the switches of the four-level Multi Point Clamped inverter circuit of FIG. 6.

Accordingly, the inverter modulation algorithm requires only three independent driving PWM signal, A, B and C. FIG. 8 illustrates said driving PWM signal referenced to the voltage of the input voltage mid-point M. Driving signal A is applied to the control gate of the switch Q10, driving signal C is applied to the gate of the switch Q11, driving signal Cn (complementary of driving signal C) is applied to the gate of the switch Q12, driving signal B is applied to the gate of the switch Q13, driving signal Bn (complementary of driving signal B) is applied to the gate of the switch Q14 and driving signal An (complementary of driving signal A) is applied to the gate of the switch Q15.

Figure 9:
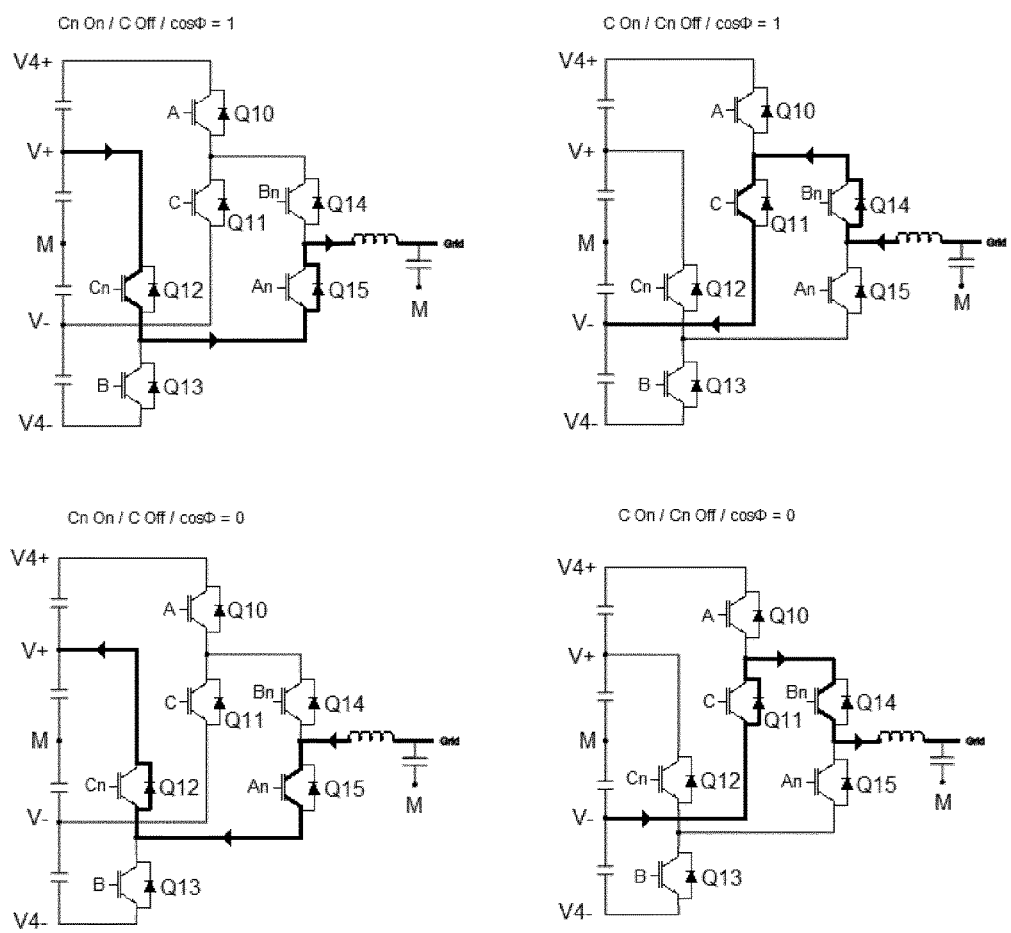
FIG. 9 shows the current paths of the Multi Point Clamped inverter circuit of FIG. 6 in a first operating condition.

During the time interval wherein V−<Vout<V+, driving signals A and B are constantly OFF and therefore driving signals An and Bn are constantly ON. Driving signals C and Cn oscillates between ON and OFF levels and provide, on the AC side, a voltage waveform oscillating between the voltage values V− and V+. The DC-AC converter works like a standard two level inverter. FIG. 9 illustrates the current paths of the inverter circuit when driving signal Cn is ON and driving signal C is OFF (and vice versa) and cos φ equals 1 or 0, wherein φ is the phase shift between voltage and current waveforms.

Figure 10:
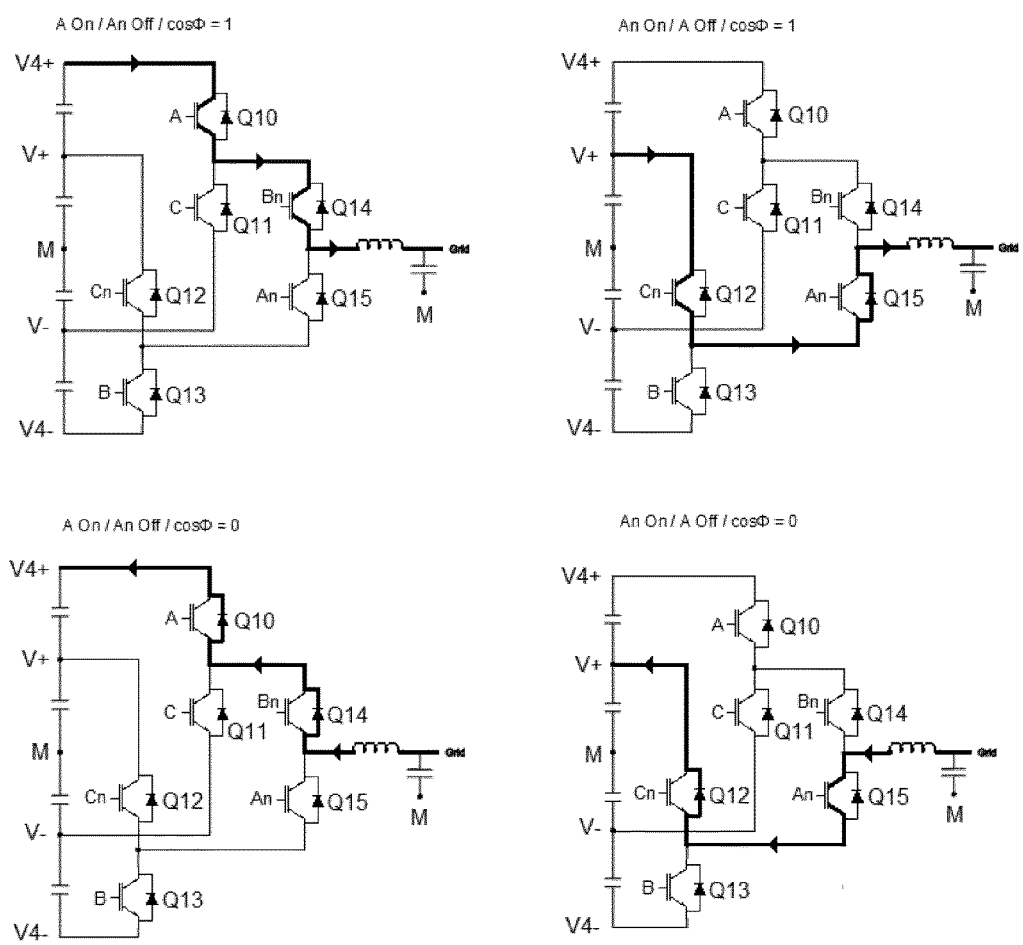
FIG. 10 shows the current paths of the Multi Point Clamped inverter circuit of FIG. 6 in a second operating condition.

When the output voltage Vout is higher than V+, driving signals Cn and Bn are constantly ON and therefore driving signals C and B are constantly OFF. Driving signals A and An oscillates between ON and OFF levels and provide, on the AC side, a voltage waveform oscillating between the voltage values V+ and V4+. FIG. 10 illustrates the current paths of the inverter circuit when driving signal A is ON and driving signal An is OFF (and vice versa) and cos φ equals 1 or 0, wherein φ is the phase shift between voltage and current waveforms.

Figure 11:
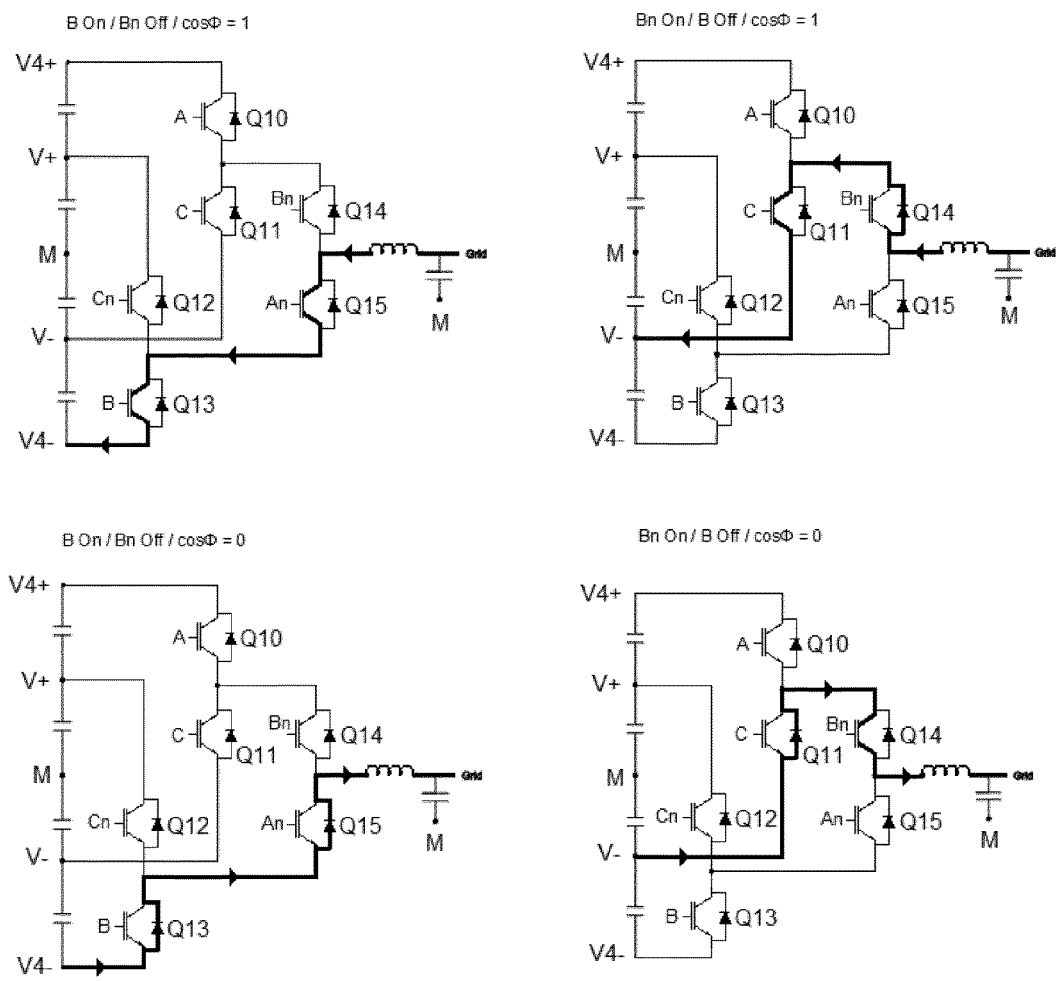
FIG. 11 shows the current paths of the Multi Point Clamped inverter circuit of FIG. 6 in a third operating condition.

When the output voltage Vout is lower than V−, driving signals Cn and A are constantly OFF and therefore driving signals C and An are constantly ON. Driving signals B and Bn oscillates between ON and OFF levels and provide, on the AC side, a voltage waveform oscillating between the voltage values V− and V4−. FIG. 11 illustrates the current paths of the inverter circuit when driving signal B is ON and driving signal Bn is OFF (and vice versa) and cos φ equals 1 or 0, wherein φ is the phase shift between voltage and current waveforms.

Said semiconductor switches preferably comprise standard IGBTs provided with antiparallel diode. Standard IGBTs can be employed, in place of common emitter IGBTs, and with a voltage rating lower than the input DC bulk voltage thus reducing cost and improving overall electrical efficiency.

Furthermore, IGBTs as power switches combine the simple gate-drive characteristics of the MOSFETs with the high-current and low-saturation-voltage capability of bipolar transistors that allow IGBTs to achieve a maximum switching frequency well greater than 100 kHz with very high reliability and ruggedness.

Three multi-level inverter according to the present invention and in particular the four-level inverter described above can easily be connected to supply three-phase AC loads or three-phase AC grids. The output terminals of each output switch block 11 will be electrically connected to one phase terminal of the AC load or the three-phase AC grids; the neutral terminal, if present, will be connected to said mid-point M, therefore assuming reference, or ground, voltage.

Figure 7:
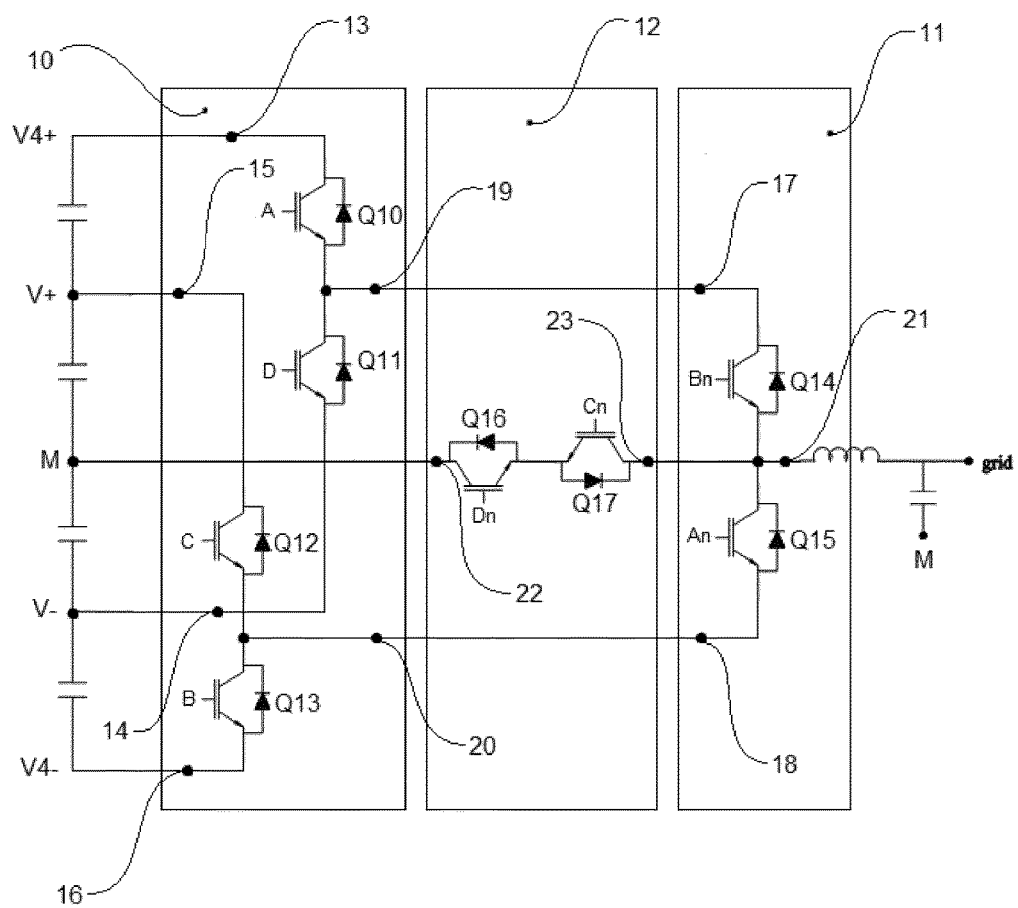
FIG. 7 shows the five-level Multi Point Clamped inverter according to the present invention with an LC output.

With reference to enclosed FIG. 7, a preferred embodiment of the five-level Multi Point Clamped inverter according to the present invention is shown. Said five-level Multi Point Clamped inverter can be easily derived from the four-level Multi Point Clamped inverter described above, by simply adding further output switch blocks 12.

Said further output switch blocks 12 may include a fourth switch block comprising a couple of switches Q16, Q17, arranged with the emitters (or the collectors) electrically connected together, the collector (or the emitter) of the first switch Q16 being the input terminal 22 of said fourth switch block and electrically connected to said mid-point M, and the collector (or the emitter) of the second switch Q17 being the output terminal 23 of said fourth switch block and electrically connected to the load terminal and to said center point of said third switch block.

Advantageously, a common emitter (or common collector) module and in particular a common emitter (or common collector) IGBT module can be employed comprising the switches Q16 and Q17 described above.

The topology described above and illustrated in FIG. 7 can be easily multiplied by three to be implemented as five-level Multi Point Clamped three-phase inverter, wherein said input switch blocks 10, said output switch blocks 11 and said further output switch blocks 12 are in number of three and the output terminals of said output switch blocks 11 are each coupled to a different one of the three phase grid terminals and said mid-point M is coupled to the neutral terminal. Same considerations apply to multi-phase systems in general.

The five-level Multi Point Clamped inverter according to the present invention preferably employs the same modulation control described above for the four level topology.

Four operative conditions occur depending on the level of output AC voltage Vout:
1) 0<Vout<V+; 2) V−<Vout<0; 3) Vout>V+ and 4) Vout<V−.

In this case four independent PWM control signals are necessary, A, B, C and D, together with their complementary signals An, Bn, Cn and Dn.

In operating conditions 1) and 2), the five-level Multi Point Clamped inverter according to the present invention works like a three levels—active neutral point clamped inverter. In fact the output voltages oscillate between the values V+ and 0V in operating condition 1) and between V− and 0V in operating condition 2). Operating conditions 3) and 4) correspond to operating conditions 2) and 3), previously discussed regarding the four-level Multi Point Clamped inverter according to the present invention the current paths of which are depicted in FIGS. 10 and 11.

Figure 12:
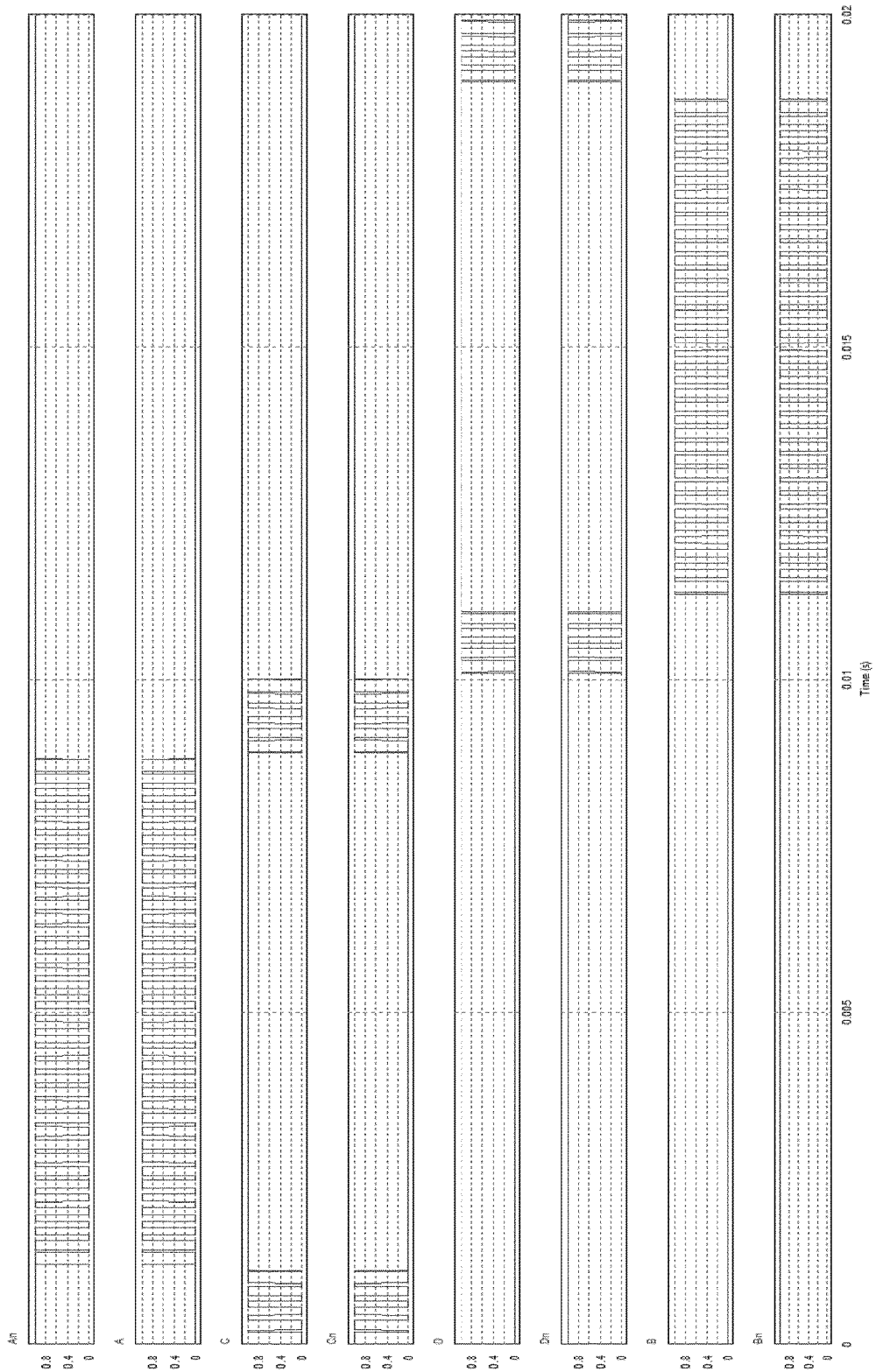
FIG. 12 shows the driving PWM signal for the switches of the five-level Multi Point Clamped inverter circuit of FIG. 7.

FIG. 12 illustrates said driving PWM signal referenced to the voltage of the input voltage mid-point M. Driving signal A is applied to the gate of the switch Q10, driving signal D is applied to the gate of the switch Q11, driving signal C is applied to the gate of the switch Q12, driving signal B is applied to the gate of the switch Q13, driving signal Bn (complementary of driving signal B) is applied to the gate of the switch Q14, driving signal An (complementary of driving signal A) is applied to the gate of the switch Q15, driving signal Dn (complementary of driving signal D) is applied to the gate of the switch Q16 and driving signal Cn (complementary of driving signal C) is applied to the gate of the switch Q17.

Figure 13:
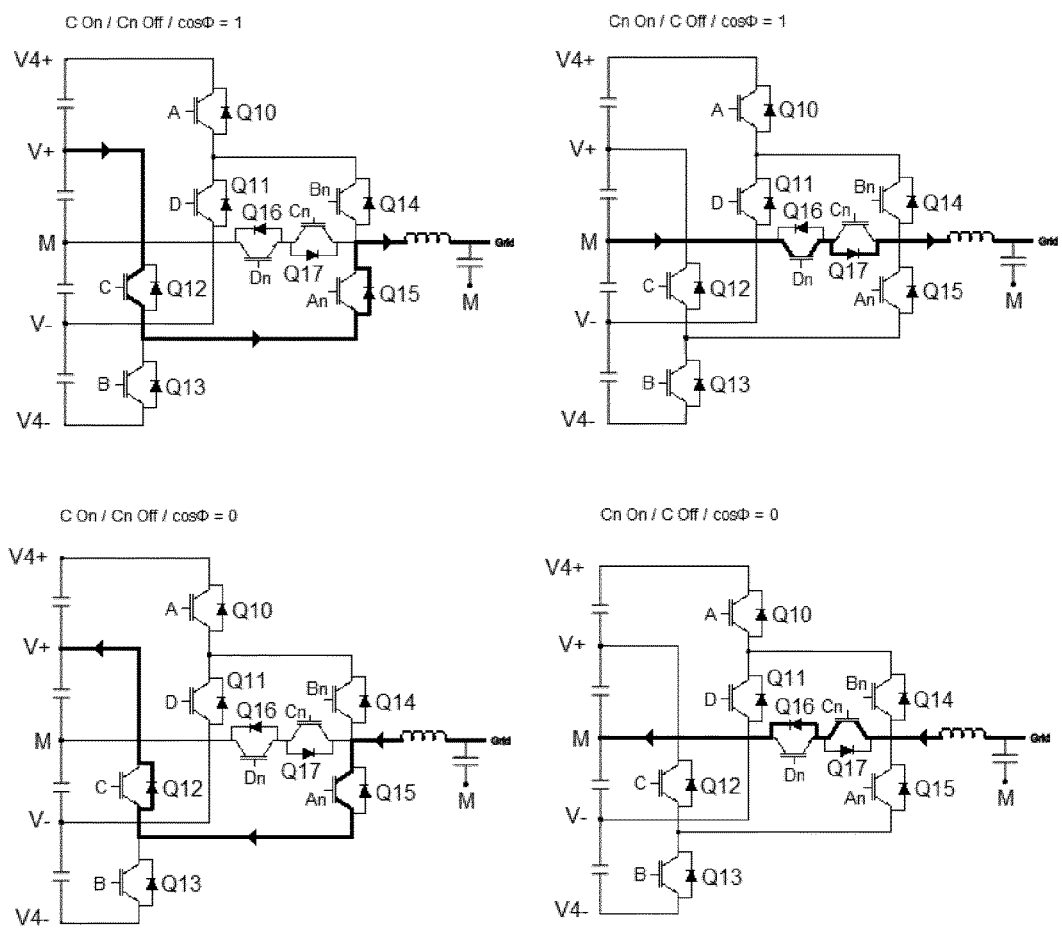
FIG. 13 shows the current paths of the Multi Point Clamped inverter circuit of FIG. 7 in a first operating condition.

During the time interval wherein 0<Vout<V+, driving signals A, B and D are constantly OFF and therefore driving signals An, Bn and Dn are constantly ON. Driving signals C and Cn oscillates between ON and OFF levels and provide, on the AC side, a voltage waveform oscillating between the voltage values 0 and V+. FIG. 13 illustrates the current paths of the inverter circuit when driving signal C is ON and driving signal Cn is OFF (and vice versa) and cos φ equals 1 or 0, wherein φ is the phase shift between voltage and current waveforms.

Figure 14:
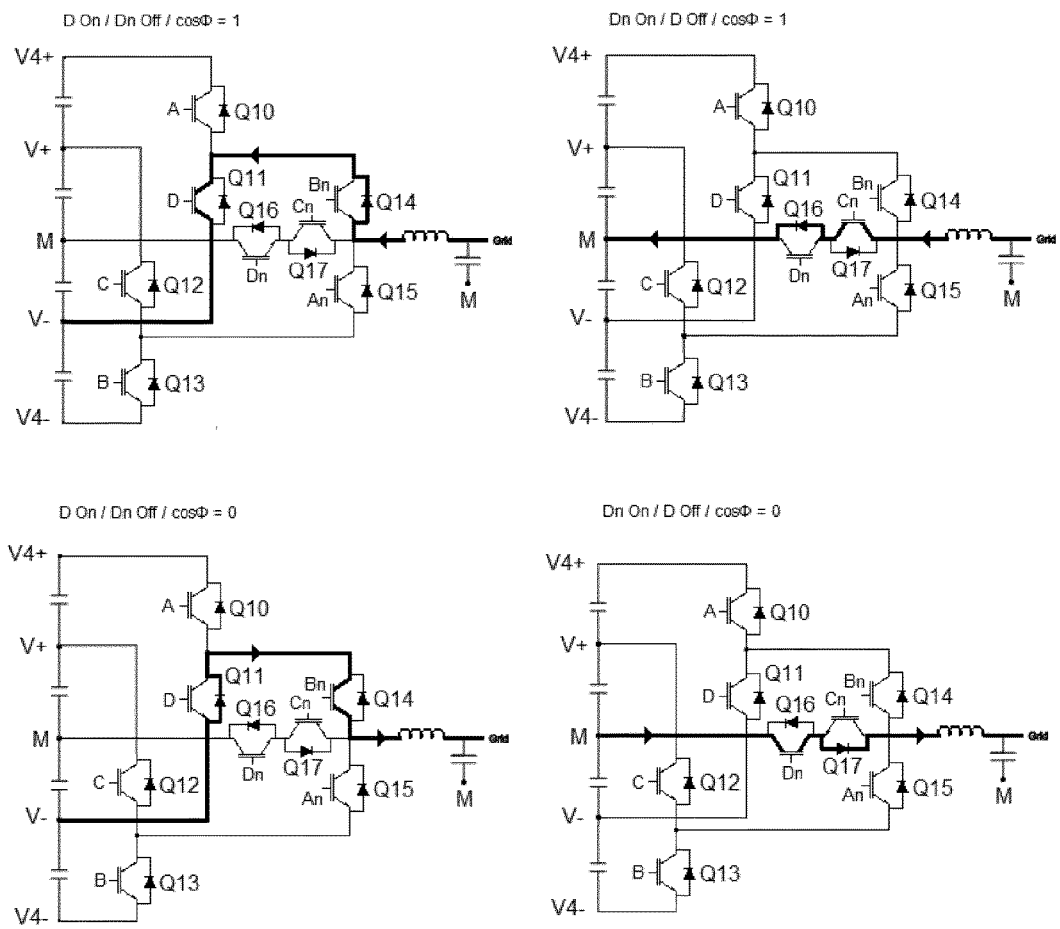
FIG. 14 shows the current paths of the Multi Point Clamped inverter circuit of FIG. 7 in a second operating condition.

When the output voltage Vout is within 0 and V−, the switches A, B and C are constantly OFF while the switches An, Bn and Cn are constantly ON. Driving signals D and Dn provide, on the AC side, an voltage waveform oscillating within the voltage values 0 and V−. FIG. 14 illustrates the current paths of the inverter circuit when driving signal D is ON and driving signal Dn is OFF (and vice versa) and cos φ equals 1 or 0, wherein φ is the phase shift between voltage and current waveforms.

The remaining two operating conditions are the same as described above for the four-level inverter according to the present invention.

When the output voltage Vout is higher than V+, driving signals C, Bn and Dn are constantly ON, driving signals Cn, B and D are constantly OFF. The branch comprising switches Q16 and Q17 is not conducting current. Driving signals A and An oscillates between ON and OFF levels and provide, on the AC side, a voltage waveform oscillating between the voltage values V+ and V4+. FIG. 10 illustrates the current paths of the inverter circuit when driving signal A is ON and driving signal An is OFF (and vice versa) and cos φ equals 1 or 0, wherein φ is the phase shift between voltage and current waveforms.

When the output voltage Vout is lower than V−, driving signals C, A and Dn are constantly OFF, driving signals Cn, An and D are constantly ON. Driving signals B and Bn oscillates between ON and OFF levels and provide, on the AC side, a voltage waveform oscillating between the voltage values V− and V4−. FIG. 11 illustrates the current paths of the inverter circuit when driving signal B is ON and driving signal Bn is OFF (and vice versa) and cos φ equals 1 or 0, wherein φ is the phase shift between voltage and current waveforms.

Preferably, the multi-level inverters according to the present invention employ IGBTs as power switches due to their feature of combining the simple gate-drive characteristics of the MOSFETs with the high-current and low-saturation-voltage capability of bipolar transistors that allows these devices to achieve a maximum switching frequency well greater than 100 kHz with very high reliability and ruggedness.

Three multi-level inverter according to the present invention and in particular the four-level inverter described above can easily be connected to supply three-phase AC loads or three-phase AC grids. The output terminals of each output switch block 11 and further output switch block 12 will be electrically connected to one phase terminal of the AC load or the three-phase AC grids; the neutral terminal, if present, will be connected to said mid-point M, therefore assuming reference, or ground, voltage.

The invention claimed is:
1. Multilevel inverter comprising:
an input power source including a plurality of DC power supplies connected in series;
a plurality of voltage level terminals for taking desired DC voltage levels from said input power source, said terminals being electrically connected to each end of said DC power supplies and comprising a voltage reference terminal;
a plurality of switch blocks, each of said switch blocks comprising at least one input terminal and at least one output terminal;
at least one load terminal for connecting to a load;
wherein said plurality of switch blocks comprises:
input switch blocks comprising:
a plurality of on/off switches, and
first input terminals and first output terminals, each one of said first input terminals being coupled to a different one of said voltage level terminals; and
output switch blocks comprising:
a plurality of on/off switches, and second input terminals, each one of said second input terminals being coupled to a different one of said first output terminals of said input switch blocks; and second output terminals, each one of said second output terminals being coupled to a different one of said at least one load terminal.

2. Multilevel inverter according to claim 1 wherein said plurality of switch blocks comprises:

further output switch blocks having third input terminals coupled to one of said voltage reference terminals; and third output terminals, each one of said third output terminals being coupled to a different one of said at least one load terminal.

3. Multilevel inverter according to claim 2 wherein said input switch blocks, said output switch blocks and said further output switch blocks comprise a plurality of ontoft switches having open modes and short-circuit modes, input terminals and output terminals.

4. Multilevel inverter according to claim 3 wherein said input power source voltage levels comprise:

a voltage mid-point coupled to said voltage reference terminal; and a higher positive DC voltage, a lower positive DC voltage, a lower negative DC voltage and a higher negative DC voltage referred to said voltage mid-point.

5. Multilevel inverter according to claim 4 wherein said input switch blocks comprise:

a first switch block having a first input terminal coupled to said higher positive DC voltage and a second input terminal coupled to said lower negative DC voltage; and a second switch block having a first input terminal coupled to said lower positive DC voltage and a second input terminal coupled to said higher negative DC voltage; and said output switch blocks comprise:

a third switch block having a first input terminal coupled to the output terminal of said first switch block, a second input terminal coupled to the output terminal of said second switch block and one output terminal coupled to one of said at least one load terminals.

6. Multilevel inverter according to claim 5 wherein said further output switch blocks comprise a fourth switch block having one input terminal coupled to said voltage mid-point and one output terminal coupled to the output terminal of said third switch block and to one of said at least one load terminal.

7. Multilevel inverter according to claim 6 wherein said first, second and third switch blocks comprise a pair of semiconductor switches provided with anti-parallel diode and arranged as half-bridges with the emitters of the upper switches electrically connected to the collectors of the lower switches at a center point, the collectors of said upper switches, and the emitters of said lower switches being the input terminals of said first, second and third switch blocks, said center points being the output terminals of said first, second and third switch blocks.

8. Multilevel inverter according to claim 7 wherein said fourth switch block comprises a pair of semiconductor switches provided with anti-parallel diode and arranged in common emitter mode, the collectors of said semiconductor switches being the input terminals and the output terminals of said fourth switch block.

9. Multilevel inverter according to claim 7 wherein said fourth switch block comprises a pair of semiconductor switches provided with anti-parallel diode and arranged in common collector mode, the emitters of said semiconductor switches being the input terminals and the output terminals of said fourth switch block.

10. Multilevel inverter according to claim 1 wherein said plurality of DC power supplies comprise a plurality of capacitors connected in series between the terminals of a single DC input voltage.

11. Multilevel inverter according to claim 1 wherein said plurality of DC power supplies comprise a plurality of batteries connected in series.

12. Multilevel inverter according to claim 7 wherein said semiconductor switches comprise IGBTs provided with antiparallel diode.

13. A multi-level inverter according to claim 1 wherein said load comprises grid phases having terminals thereof, each phase terminal being coupled to a different one of said at least one load terminals.

14. Multilevel inverter according to claim 13 wherein said load comprises a single phase grid having terminals thereof comprising a neutral terminal coupled to said voltage reference terminal.

15. Multilevel inverter according to claim 13 wherein said load comprises a three-phase grid having terminals thereof comprising a neutral terminal coupled to said voltage reference terminal.

16. Multilevel inverter according to claim 2 wherein said input switch blocks, said output switch blocks and said further output switch blocks comprise a plurality of on/off switches having open modes and short-circuit modes, input terminals and output terminals.

17. Multilevel inverter according to claim 1 wherein said input power source voltage levels comprise:

a voltage mid-point coupled to said voltage reference terminal; and a higher positive DC voltage, a lower positive DC voltage, a lower negative DC voltage and a highei negative DC voltage referred to said voltage mid-point.

18. Multilevel inverter according to claim 17 wherein said input switch blocks comprise:

a first switch block having a first input terminal coupled to said higher positive DC voltage and a second input terminal coupled to said lower negative DC voltage; and a second switch block having a first input terminal coupled to said lower positive DC voltage and a second input terminal coupled to said higher negative DC voltage; and said output switch blocks comprise:

a third switch block having a first input terminal coupled to the output terminal of said first switch block, a second input terminal coupled to the output terminal of said second switch block and one output terminal coupled to one of said at least one load terminals.

19. Multilevel inverter according to claim 5 wherein said first, second and third switch blocks comprise a pair of semiconductor switches provided with anti-parallel diode and arranged as half-bridges with the emitters of the upper switches electrically connected to the collectors of the lower switches at a center point, the collectors of said upper switches and the emitters of said lower switches being the input terminals of said first second and third switch blocks, said center points being the output terminals of said first, second and third switch blocks.

20. Multilevel inverter according to claim 6 wherein said fourth switch block comprises a pair of semiconductor switches provided with anti-parallel diode and arranged in common emitter mode, the collectors of said semiconductor switches being the input terminals and the output terminals of said fourth switch block.

* * * * *